A. GARDON.
INSECT TRAP.
APPLICATION FILED APR. 1, 1921.
1,385,207.
Patented July 19, 1921.
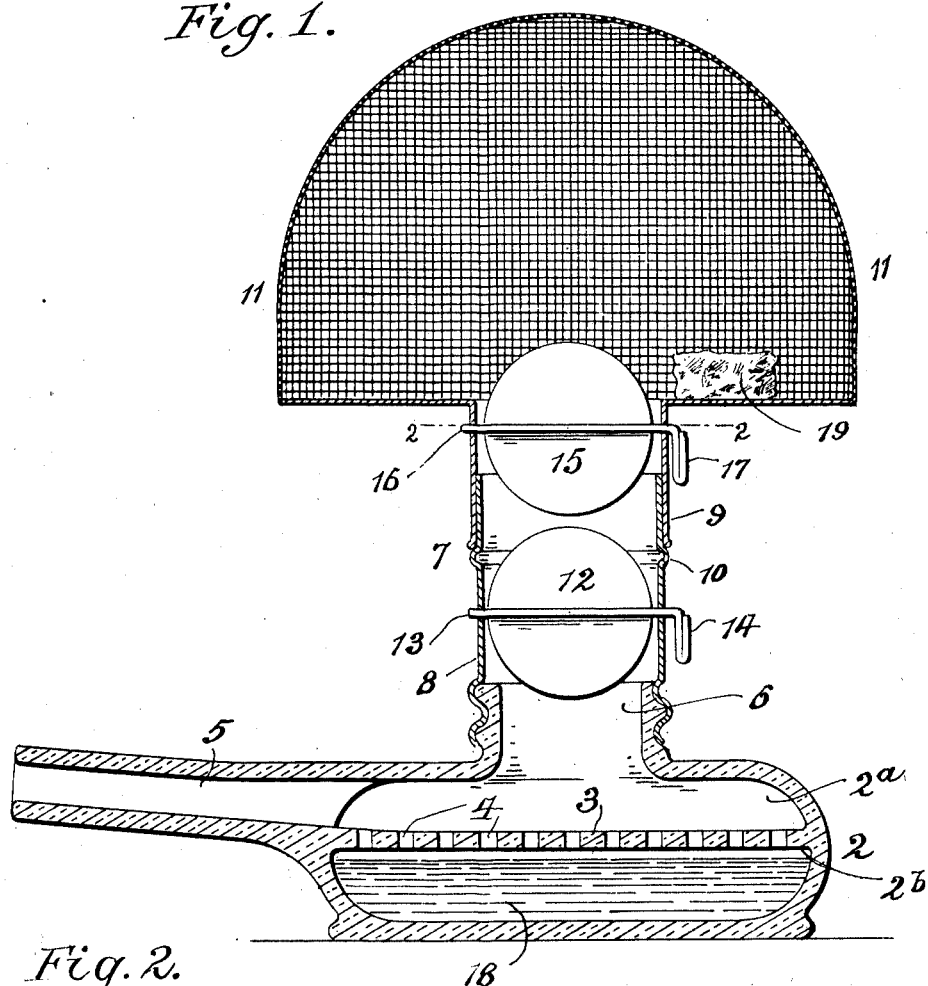
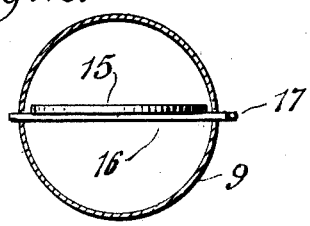
Inventor
Ambroise Gardon
By his Attorney

UNITED STATES PATENT OFFICE.

AMBROISE GARDON, OF PETERSON, SASKATCHEWAN, CANADA.

INSECT-TRAP.

1,385,207.    Specification of Letters Patent.    Patented July 19, 1921.

Application filed April 1, 1921. Serial No. 457,623.

*To all whom it may concern:*

Be it known that I, AMBROISE GARDON, a British subject, and resident of Peterson, Province of Saskatchewan, Dominion of Canada, have invented certain new and useful Improvements in Insect-Traps, of which the following is a specification.

This invention relates to insect traps, having reference particularly to a house fly trap, the object thereof being the provision of a device of this character which is simple in construction, durable and inexpensive, and which comprises few parts so assembled that they are readily detachable, whereby they may be disconnected for the purpose of cleansing them to maintain the device in clean and sanitary condition, both inside and out.

The device comprises a non-corrosive vessel adapted for containing fluid bait and having a contracted inlet for flies and a relatively large outlet, a passageway communicating with said outlet and a commodious screened compartment for accommodation of a large number of flies, and other novel features all as hereinafter fully described and specifically set forth in the appended claims.

In the accompanying drawings forming part of this specification, Figure 1 is a vertical sectional elevation illustrating an embodiment of my invention; and Fig. 2 is a cross section taken on the line 2—2 of Fig. 1.

In the drawings 2 indicates a hollow vessel which is closed on all sides and composed preferably of glass or analogous non-corrosive material, said vessel embodying an upper compartment 2ª and a lower compartment 2ᵇ; these compartments are separated by means of a horizontal partition 3, having perforations 4.

Leading into the compartment 2ª, is a tubular spout 5, for ingress of flies to said compartment, and leading from said compartment is a relatively large tubular outlet 6, for egress of flies from said compartment; said outlet communicates with a fly-way 7, and it is annularly screw-threaded for engagement with said tubular fly-way 7, which comprises two telescopically connected sections 8 and 9, the section 8 being screw-threaded at its lower end for detachable engagement with the outlet 6 of the vessel 2, and having an annular bead or stop 10, to limit the downward movement of the section 9. The upper end of said section 9 is connected to and communicates with a housing 11, composed of wire mesh and of sufficiently large proportion to accommodate a large number of flies.

As a means for closing the outlet 6 of the vessel 2, against egress of flies, I provide a door 12, which is carried by a rod 13 journaled through the sides of the section 8 of the fly-way 7, said rod having a depending handle 14, the weight of which maintains the door 12 normally open, as shown in the drawings. A similar door 15, is hung on a rod 16, journaled through the walls of the section 9, said door is also maintained normally open by the weight of its depending handle 17.

In the operation and use of the invention, the compartment 2ᵇ, of the vessel 2, is supplied through the inlet 5 and the perforations 4, with a quantity of substance adapted to attract flies, such as molasses, honey or other syrupy substance, and an auxiliary bait substance such as a lump of sugar, as 19, is placed within the housing 11. The device is then placed within a fly-infested inclosure, as a kitchen or other room, and the odor of the contained bait attracts the flies through the spout 5 into the compartment 2ª from whence, as the bait 18 is beyond their reach, they ascend through the fly-way 7 to the housing 11, attracted by the accessible bait 19, where they are allowed to swarm until a sufficient number is contained. Then the doors 12 and 15 are closed across the fly-way and the housing is detached for the purpose of destroying its contained accumulation of flies; this may be accomplished by either burning or scalding the flies while they are contained within the housing, the door 15 being kept closed to prevent escape of the flies before they are killed and while the housing is being handled; the door 12 being also kept closed to prevent escape of any flies that may remain in the compartment 2ª. The housing is then replaced and the operation repeated.

I do not wish to confine myself to the specific mechanical details and formation of the elements of my improvements as herein shown and described, nor to any specific quality of bait, as it is obvious that under the spirit of my invention I am entitled to the employment of such variations of mere mechanical detail as may rightly fall within the scope of the appended claims; and I may mix poisonous or stupefying drugs with the bait.

Having thus described my invention, what I claim as new and desire to secure by Letters Patent, is:

1. A fly trap comprising a bait-containing vessel having a contracted inlet and a relatively large outlet, and a fly-way and screened housing communicating with said outlet.

2. A fly trap comprising a bait-containing vessel divided into two horizontal compartments, said compartments separated by a perforated partition, the upper one of said compartments having a contracted inlet and a relatively large outlet, and a fly-way leading from said outlet, and a screened housing communicating with said fly-way.

3. A fly trap comprising a vessel divided into two horizontal compartments, said compartments separated by a perforated partition, the upper one of said compartments having a contracted inlet for ingress of flies, and a relatively large outlet, the lower one of said compartments containing bait, and a tubular fly-way comprising two telescopic sections, said sections respectively having a normally open door, and a housing composed of wire netting communicating with and connected to the upper one of said sections, said housing containing bait.

4. A fly trap comprising a bait-containing vessel having a contracted inlet and a relatively large outlet, and a sectional fly-way having its lower section detachably connected with said outlet, and a screened housing connected with the upper section of said fly-way, and means for opening and closing the sections of said fly-way.

Signed at Bruno, Saskatchewan, in the Dominion of Canada, this 20th day of December, A. D. 1910.

AMBROISE GARDON.